June 10, 1969 F. C. MARINO ET AL 3,449,720
SIGNAL DURATION AND PULSE WIDTH RESPONSIVE CONTROL APPARATUS
Filed Aug. 9, 1965
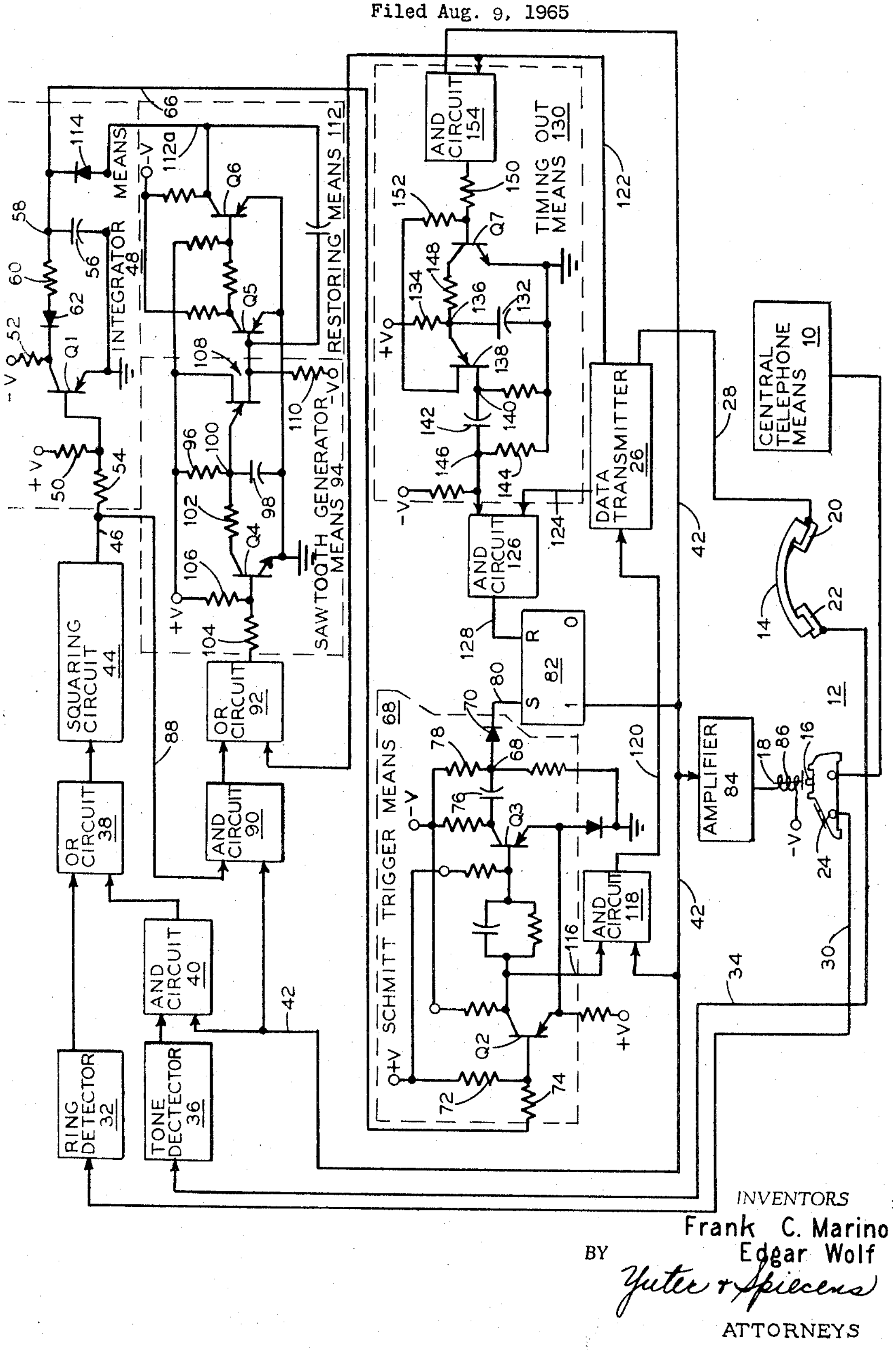
INVENTORS
Frank C. Marino
Edgar Wolf
BY Yuter & Spiecens
ATTORNEYS United States Patent Office 3,449,720
Patented June 10, 1969

3,449,720
SIGNAL DURATION AND PULSE WIDTH RESPONSIVE CONTROL APPARATUS

Frank C. Marino, Huntington, and Edgar Wolf, New Hyde Park, N.Y., assignors to Digitronics Corporation, Albertson, N.Y., a corporation of Delaware
Filed Aug. 9, 1965, Ser. No. 478,132
Int. Cl. H04q 5/14; H04m 11/06
U.S. Cl. 340—167 8 Claims

ABSTRACT OF THE DISCLOSURE

Control apparatus for connecting a data transmitter with a data receiver which generates first and second control signals wherein the second control signal has a preselected width. The apparatus includes means responsive to the first control signal to establish a connection between the data transmitter and the data receiver and to initiate the transfer of data in response to the second control signal. Means are also provided for disabling the first-named means if the second signal is not received for a preselected interval of time or if a cycle of the signal is not of the preselected pulse width.

This invention pertains to control apparatus for performing a control function in response to control signals of particular kinds and durations.

In remote control systems, control signals are often used to activate distant apparatus. Of the many such control systems, one concerned with the activation of a remote data transmitter is being more and more exploited. As an example, consider a system wherein data is accumulated at many remote stations and a central station interrogates the remote stations for the data. Heretofore, such systems have been employed over closed private communication links. With private communication links, there is a minimum chance that the data will be transmitted to an unauthorized user. However, these private systems are very expensive. Therefore, their use is limited to large data acquisition centers. Lately, there have been available means for utilizing public utility telephone networks as communication links. In such systems, a remote subscriber telephone is employed. The data may be recorded on the magnetic tape of an inexpensive tape recorder. The signal output of the recorder, as tones, is fed via a speaker into the microphone portion of the telephone handset. Obviously, the tape recorder can be activated to play back by a circuit which is responsive to the ringing signal of the subscriber telephone. However, it should be immediately apparent that any remote telephone subscriber, by dialing a wrong number which is the number of the telephone to which the tape recorders are connected, can receive the data. Although the data may be coded to maintain secrecy, there is the possibility that the recorder is set up to only play back once. Such would be the case where economy is a prime consideration, since automatic rewind and rerun facilities add to the expense of the tape recorder.

One immediate solution to the problem, is to use the ringing signal to prime the tape recorder to operate and then to utilize a characteristic tone signal in the voice circuits of the telephone to trigger the recorder into operation. However, it should be realized that conventional telephone voice circuits have a limited bandpass which is limited to the frequencies of the human voice. Therefore, it is possible for a subscriber to not only call the wrong number but to also speak into the telephone. In such a case, it can happen that he speaks a word which includes the frequency of the characteristic tone signal. Even if the subscriber calling the wrong number does not speak, noise in the system may include the triggering characteristic tone frequency.

It is a accordingly a general object of the invention to provide an improved signal responsive control apparatus which is immune to undesired signal activation.

It is another object of the invention to provide improved signal responsive control apparatus which is activated only by specific control signals.

It is a specific object of the invention to provide a control apparatus for controlling the connection of a remote subscriber telephone only to a specific calling telephone in a public utility telephone network.

Briefly, the invention contemplates control apparatus for connecting a data transmitter to a data receiver. The data receiver generates first and second sequential control signals. The apparatus comprises means for sensing for the first control signal to establish a connection between the data transmitter and the data receiver. There are also means for sensing for the second control signal for initiating the transfer of data from the data transmitter to the data receiver only if the second control signal is received uninterruptedly for a given period of time.

A feature of the invention is a circuit which only generates an indication if a signal is received uninterruptedly for a given period of time.

Other objects, features and advantages of the invention will be apparent from the following detailed description when read with the accompanying drawing whose sole figure shows, by way of example and not limitation, the now preferred embodiment of the invention.

In the description many logical circuit elements are employed which depend on the logical representation of binary signals. Although many signal levels may be used to represent the logical inputs the following convention will be employed. A binary zero ("0") is represented by ground potential and a binary one ("1") is represented by a negative six volt potential.

There is employed an AND circuit which transmits a binary one when all of its inputs are simultaneously at binary one. At all other times it transmits a binary zero. There is an OR circuit which transmits a binary one only when at least one of its inputs is at binary one. There is also employed a trigger or flip-flop of the Eccles-Jordan type. The flip-flop has a "1" output, a "0" output, an "S" input and an "R" input. When a signal is received at the "S" input, at the end of that pulse, the "1" output starts transmitting a binary one (a negative voltage) and the "0" output starts transmitting a binary zero, ground potential. This situation remains until a signal is received by the "R" input. At the end of that pulse the "1" output starts transmitting binary zero and the "0" output starts transmitting binary one.

With this in mind the system will now be described. As a specific example, the invention will be described with respect to the transmitting of data from a called subscriber telephone to a calling subscriber telephone in a public utility telephone system. The data to be transmitted is stored on the magnetic tape of a magnetic tape recorder.

Accordingly, the system comprises central telephone means 10 which includes a calling subscriber telephone, trunk lines and exchanges associated with a public telephone network. The calling telephone is a conventional telephone including dialing means, but further includes means for generating a characteristic tone of say 1200 cycles per second upon command of the user. In its simplest form, the tone generator can be a tuning fork which is is held near the speaker portion of the handset of the calling telephone. Of course, in more sophisticated systems the tone generator can be suitable electronic means. In addition, the calling telephone has associated therewith means for receiving the data. In its simplest form it can be a person listening to the telephone. In more sophisticated systems wherein the transmitted data is coded frequency shift signals, the receiver may be a Dataphone 202 Subset, manufactured by the Western Electric Company.

At the remote data transmitter there is a standard telephone 12 which is connected to the public utility telephone network in the conventional manner. The only difference between a regular subscriber telephone and telephone 12 is that the handset 14 is removed from the cradle and the cradle switch 16 is controlled by a solenoid actuated plunger 18. Normally, the plunger 18 presses down on the cradle switch 16 simulating the presence of the handset 14 on the cradle. When the solenoid is actuated the plunger retracts, simulating the lifting of the handset from the cradle. In addition, the mouthpiece portion of the handset 14 is covered by a speaker 20; and the earpiece portion of the handset is covered by a microphone 22. Lastly, a ring sensing microphone 24 is conveniently positioned so as to respond to the bell in the base of the telephone.

The data is transmitted as audible signals from data transmitter 26 which may be a conventional magnetic tape recorder which is modified to include means responsive to a control signal for activating the tape recorder to a playback condition and which also generates a signal while the tape recorder is in the playback condition. In addition, the data transmitter 26 may include a circuit for detecting an end of message code, recorded on the tape, and for transmitting a signal when the end of message code is detected. End of message may also be detected by absence of tape read data for a duration exceeding some minimum after data has been read. The remainder of the figure is concerned with controlling the transmission of data from data transmitter 26 to central telephone means 10.

Broadly, a subscriber at the central calling subscriber telephone dials the number of the remote telephone 12. When the ring is detected a solenoid is activated which withdraws plunger 18 from the cradle switch 16. A connection is thus established between telephone 12 and the central telephone. Next the central calling telephone transmits a characteristic tone of say 1200 cycles per second for 2 seconds. If this tone is uninterruptedly sensed throughout this time of 2 seconds by microphone 22, data transmitter 26 is activated. The data as signals is fed via line 28 to speaker 20 where it is converted to audible tones that are fed into the mouthpiece portion of handset 14. At the end of the message, data transmitter 26 generates the end of message signals which is used to deactivate the tape recorder therein, and deactivate the solenoid. Consequently, plunger 18 presses down on cradle switch 16 breaking the connection between telephone 12 and the central calling telephone. The above is normal operating procedure. Under abnormal conditions, it is possible that a third party erroneously calls the telephone 12. In such a case, it is remotely possible that the third party or line noise will cause the reception by speaker 22 of a tone which has the frequency of the characteristic tone. However, it is highly likely that this tone will be transient in nature and not last the required uninterrupted 2 seconds. The control apparatus will, therefore, not activate data transmitter 26, and after a certain time will deactivate the solenoid causing plunger 18 to break the connection.

The details of the control apparatus and how it functions will now be described. Microphone 24 is connected via line 30 to ring detector 32 which may include gain control circuits and a filter. The output of ring detector 32 is connected to one input of OR circuit 38. The output of OR circuit 38 is connected to the input of squaring circuit 44 which may include overdriven amplifiers so that the quasi-sinusoidal signals fed thereto are transmitted as square wave signals. The output of squaring circuit 44 is connected via line 46 to the input of integrator means 48 which includes a transistor $Q_1$ having its emitter connected to ground, its base connected via base biasing resistor 50 to positive voltage source +V, and its collector connected via resistor 52 to negative voltage source −V. Resistor 54 connects the base of transistor $Q_1$ to line 46. An integrating capacitor 56 has one terminal grounded and its second terminal 58 connected via serially connected resistor 60 and diode 62 to the collector of transistor $Q_1$. Capacitor 56 is initially charged to about ground potential. Each square wave pulse causes a slight accumulation of negative charge on the capacitor, causing a related drop in the voltage at terminal 58. Line 66 connects terminal 58 to the input of Schmitt trigger means 68.

Schmitt trigger means 68 is of conventional design with transistor $Q_2$, quiescently, cut off and transistor $Q_3$, quiescently, conducting. When the voltage on line 66 drops below a certain value, transistor $Q_3$ cuts off and transistor $Q_2$ conducts.

When the voltage at terminal 58 starts returning to ground potential a point is reached where Schmitt trigger means 68 returns to its quiescent state of transistor $Q_3$ conducting and transistor $Q_2$ cut-off. When a ring signal is sensed by microphone 24, capacitor 56 starts accumulating charge as hereinabove described. When the voltage across capacitor 56 drops to the given level, trigger 68 is triggered to the active state of transistor $Q_2$ conducting and transistor $Q_3$ cut off. During the time after the first series of ring cycles stops and before the next series starts, capacitor 56 is discharged back to ground potential through the path from voltage source +V, resistors 72 and 74 and line 66. When the voltage on terminal 58 rises to a given level, trigger means 68 returns to the state where transistor $Q_2$ is cut off and transistor $Q_3$ conducts. The collector of transistor $Q_3$ returns to ground potential and a positive going pulse is formed by the differentiating network comprising capacitor 76 and resistor 78 and fed via diode 70 and line 80, to the set input S of flip-flop 82. The "1" output thereof drives line 42 to a negative potential. The input of amplifier 84 is connected to line 42.

Amplifier 84 is a phase inverting power amplifier having an output terminal connected to one end of solenoid 86 whose other end is returned to source of negative potential −V. Therefore when line 42 is at a negative potential, the solenoid is energized and plunger 18 withdrawn from cradle switch 16. A connection is thus established between telephone 12 and central telephone means 10 and there results no further ring signals.

Under normal conditions, central telephone means 10 generates the characteristics tone. The tone is picked up by microphone 22 and the signal version of this tone is fed via line 34 to tone detector 36. Tone detector 36 may include an amplifier and filter. The output of tone detector 36 is connected to an input of AND circuit 40. Since the other input of AND circuit 40 is connected to line 42 which is at a negative potential, the signal version of the tone passes from the output of AND circuit 40 and, via OR circuit 38, squaring circuit 44, to line 46 to cause the build-up of charge on capacitor 56 in the same manner as for the ring signal. At the same time, the square waveform is fed via line 88 to one input of AND circuit 90. Since the second input of AND circuit 90 is connected to line 42 which is at a negative potential, the square wave is fed from the output of AND circuit 90 to an input of OR circuit 92. The output of OR circuit 92 is connected to the input of sawtooth generator means 94.

Sawtooth generator means 94 includes a resistor 96 and capacitor 98 serially connected between source of voltage +V and ground. Consequently, capacitor 98 will charge to voltage +V unless prematurely discharged. Periodic discharging is provided by transistor $Q_4$ whose collector is connected by current limiting resistor 102 to junction 100. Each cycle of square wave signal received by transistor $Q_4$ via resistor 104 from OR circuit 92 overcomes the base bias supplied by resistor 106 causing the transistor to stop conducting. The time constant of resistor 96 and capacitor 98 is so chosen that the voltage at junction 100 will reach a predetermined value in slightly more than one cycle of the square wave signal. Whenever the voltage of junction 100 reaches this value because there is as little of one cycle of square wave missing (and consequently a cycle of the characteristic tone) unijunction transistor (double base diode) 108 fires. In other words, means 94 is operable to examine the square wave signal on a per cycle basis and to completely discharge the capacitor 56 if a single cycle of the square wave is not of the correct pulse width or frequency.

The emitter of unijunction transistor 108 is connected to junction 100, one base is connected to voltage source +V, and the other base is connected, via resistor 110, to voltage source −V, and also to the input of restoring means 112. Consequently, whenever transistor 108 fires a positive going pulse is fed to restoring means 112.

Restoring means 112 is a conventional monostable or "one shot" multivibrator wherein transistor $Q_5$ thereof is normally conducting and transistor $Q_6$ is cut off. The positive going pulse is fed to the base of transistor $Q_5$ turning it off and turning transistor $Q_6$ on. When transistor $Q_6$ turns on and as long as it remains on, current is transferred from its collector via line 112 and diode 114 to capacitor 56 cancelling an accumulation of charge thereon. When the monostable multivibrator returns to its stable state, the junction 58 is at ground potential. In order for integrator means 48 to trigger Schmitt trigger means 68 it must now reaccumulate the requisite amount of charge. In this way, it is insured that only the uninterrupted presence of the characteristic tone signal for a given period of time can trigger the Schmitt trigger means 68.

If the tone signal satisfies this requirement, Schmitt trigger means 68 is triggered when junction 58 reaches the requisite level. The collector of transistor $Q_2$ shifts to a negative potential and a negative potential signal is fed via line 116 to one input of AND circuit 118. Since the other input of AND circuit 118 is connected to line 42 which is at a negative potential, a negative potential is transfered from the output of AND circuit 118, via line 120, to data transmitter 26. This signal turns on the tape recorder therein and causes the generation of a negative going signal on line 122. Data transmitter 26 now transmits the data via line 28 to speaker 20 and from there to central telephone means 10.

The last unit of data on the magnetic tape is an end of message code which causes data transmitter 26 to transmit a positive going signal via line 124, AND circuit 126 and line 128 to the reset R of flip-flop 82 which is restored to its reset state. (It should be noted that AND circuits perform a logical OR function for positive signals at their inputs.) The negative voltage is removed from line 42. Consequently, solenoid 86 is deenergized and plunger 18 presses down on cradle switch 16. The connection between telephone 12 and central telephone means 10 is broken.

It is now necessary to consider the restoration of flip-flop 82 to its reset state after it has been set in response to a cycle of ring signal which is not followed by an uninterrupted characteristic tone. The timing out means 130 which is connected to the other input of AND circuit 126 performs this function.

Timing out means 130 will transmit a positive going signal from its output to the other input of AND circuit 126 if data transmiter 26 is not energized and starts transmitting a positive signal on line 122 a given time and after the cycle of ring signal has set flip-flop 82. The timing out means 130 inches a capacitor 132 and a resistor 134 connected between source of voltage +V and ground. Consequently capacitor 132 will acquire positive charge. The voltage at the junction 136 will rise from ground toward the voltage of source +V in a period of time related to the time constant of resistor 134 and capacitor 132. When the junction voltage reaches a certain value unijunction transistor 138 fires causing the junction 140 to rise sharply. This positive going wavefront is shaped into a positive pulse by the differentiator including capacitor 142 and resistor 144 which is fed from junction 146 (the output of timing out means 130) to AND circuit 126.

In order to prevent the generation of this pulse it is necessary to discharge capacitor 132 before the voltage on junction 136 reaches the firing voltage of transistor 138. The discharge is performed by transistor $Q_7$ whose collector is connected via current limiting resistor 148 to junction 136. Whenever the signal transmitted by the resistor 150 connected to the base of transistor $Q_7$ is non-negative, base bias resistor 152 connected between the base and the source of potential +V biases the transistor $Q_7$ into conduction. As long as transistor $Q_7$ conducts capacitor 132 is continuously discharged. Now, it should be recalled that, when flip-flop 82 is set in response to a ring cycle, line 42 is at a negative voltage. One input of AND circuit 154 is connected to line 42. The other input is connected to line 122. As long as data transmitter 26 is not operating, the voltage on line 122 is negative, and the output of AND circuit 154 which is connected to resistor 150 is at a negative voltage. Therefore, capacitor 132 charges. When data transmitter 26 starts operating the voltage on line 122 goes to ground and the voltage at the output of AND circuit 154 switches from a negative value to ground. Transistor $Q_7$ starts conducting and capacitor 132 is discharged. Therefore, if data transmitter 26 starts operating before capacitor 132 charges to the firing voltage of transistor 138 no reset pulse is transmitted from timing out means 130 to flip-flop 130. Since the activation of data transmitter 26 depends on the receipt of a characteristic tone for a given uninterrupted period of time, it should be apparent that the absence of this condition will cause the resetting of flip-flop 82 and the disconnection of telephone 12 from central telephone means 10.

What is claimed is:

1. Apparatus for giving an indication only when a signal is received uninterruptedly for a given period of time and each cycle of said signal has a preselected width comprising a first timing circuit means for generating a voltage whose amplitude changes as a function of time from a base voltage level as long as said signal is received, a second timing circuit means which generates a voltage whose amplitude changes as a function of time from an initial voltage level to a first voltage level whenever the signal is absent for a second period of time less than said given period of time or a cycle of said signal is not of said preselected width, means connected to said second timing circuit means for returning the voltage generated by said first timing circuit means to the base voltage level whenever the voltage generated by said second timing circuit means reaches said first voltage level, and means connected to said first timing circuit means to give an indication when the voltage generated by said first timing circuit means reaches a second voltage level.

2. Apparatus for giving an indication only when a periodically alternating signal is received uninterruptedly for a given period of time and each cycle of the signal has a preselected width comprising a first timing circuit means for accumulating alternations of the alternating signals and for generating a voltage having an amplitude proportional to the number of accumulated alternations while said periodically alternating signal is being received, a second timing circuit means responsive to the periodically alternating signal for generating a control voltage whenever at least a given number of alternations are not received by said second timing means or each cycle of the signal is not of said preselected width, means for receiving said control voltage for removing all alternations accumulated by said first timing circuit means so that the latter must start reaccumulating alternations, and means responsive to said first timing circuit means for giving an indication when the voltage generated by the latter attains a given amplitude.

3. The apparatus of claim 2 wherein the given number of non-received alternations is one.

4. Apparatus for giving an indication only when an input signal of a given periodic alternating frequency is received uninterruptedly for a given period of time comprising integrator means, receiving the input signal, for incrementally building up from a base level a voltage proportional to the number of cycles of input signal received, a sawtooth voltage generator means for generating a sawtooth voltage swinging from a first to a second voltage level in a period of time equal to a given number of cycles of the input signal, means for receiving the input signal and for each received cycle thereof restoring the sawtooth voltage to said first voltage level, restoring means connected to said sawtooth generator means for restoring the voltage being built up by said integrator means to the base level whenever the sawtooth voltage attains said second voltage level so that said integrator means restart the incremental buildup of voltage whenever there is a gap of said given number of cycles in the input signal, and means connected to said integrator means for giving an indication whenever the incrementally buildup voltage exceeds a voltage related to number of cycles of input signal greater than said given number of cycles of input signal.

5. The apparatus of claim 4 wherein said sawtooth voltage generator means comprises a resistor and capacitor connected in series, a voltage means connected across said resistor and capacitor, electronic switch means connected between said voltage means and the junction of said resistor and said capacitor so that whenever said electronic switch means is activated said capacitor is discharged, said electronic switch means including means for receiving the input signal for activating said electronic switch means during each received cycle of the input signal, and voltage responsive switch means for discharging said capacitor and activating said restoring means when the voltage across said capacitor attains said second voltage level.

6. Apparatus for giving an indication only when an input signal of a given periodic alternating frequency is received uninterruptedly for a given period of time comprising: integrator means receiving the input signal for incrementally building up from an initial level a voltage proportional to the number of cycles of input signal received, said integrator means comprising a signal amplifier including an input for receiving the input signal and an output for transmitting current signals, an integrating capacitor including a first terminal connected at a fixed voltage and a second terminal, a first unidirectional current conductor connected between the first terminal of said integrating capacitor and the output of said signal amplifier; a sawtooth voltage generator means comprising a resistor and capacitor connected in series, a voltage means connected across said resistor and capacitor, electronic switch means connected between said voltage means and the junction of said resistor and said capacitor so that whenever said electronic switch means is activated said capacitor is discharged, said electronic switch means including means for receiving the input signal for activating said electronic switch means during each received cycle of the input signal, and voltage responsive switch means for discharging said capacitor and generating a triggering voltage; a current pulse generator including an input connected to said sawtooth voltage generator means and an output for generating a pulse of current pulse upon receipt of the triggering voltage; a second unidirectional current conductor for connecting the ouput of said current pulse generator to the second terminal of said integrating capacitor; the current pulse generated by said current pulse generator having such a polarity to discharge said integrating capacitor; and a voltage level sensitive signal generator including an input and an output for transmitting a signal when the voltage at the second terminal of said integrating capacitor reaches a given amplitude.

7. Control apparatus for connecting a data transmitter to a data receiver which generates first and second sequential control signals wherein the second control signal has a preselected pulse width and frequency comprising connect means for sensing for the first control signal to establish a connection between said data transmitter and said data receiver, and to initiate the transfer of data from the data transmitter to the data receiver in response to the reception of said second control signal; and disabling means responsive to the interruption of said second control signal within a preselected interval of time for disabling said connect means, said disabling means being further responsive to a cycle of said second control signal having a width other than a preselected width for disabling said connect means.

8. Control apparatus as in claim 7, and disconnect means responsive to the absence of said second control signal for a preselected interval of time after said connect means has operated and established said connection for opening the connection between said data transmitter and said data receiver.

References Cited

UNITED STATES PATENTS

| | | | |
|---|---|---|---|
| 2,769,033 | 10/1956 | Waldman. | |
| 3,139,539 | 6/1964 | Hewett | 307—232 |
| 3,045,069 | 7/1962 | Sontheimer | 179—6 |
| 3,284,791 | 11/1966 | Voigt et al. | 340—171 X |
| 3,299,404 | 1/1967 | Yamarone et al. | 340—171 X |
| 3,317,745 | 5/1967 | Scharf | 307—234 |

JOHN W. CALDWELL, *Primary Examiner.*

H. I. PITTS, *Assistant Examiner.*

U.S. Cl. X.R.

179—6; 340—152, 147